US012574765B2

(12) United States Patent
Zhou et al.

(10) Patent No.: US 12,574,765 B2
(45) Date of Patent: Mar. 10, 2026

(54) RESETTING A BEAM BASED AT LEAST IN PART ON A SUBCARRIER SPACING

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/549,823

(22) PCT Filed: May 5, 2022

(86) PCT No.: PCT/CN2022/090881
§ 371 (c)(1),
(2) Date: Sep. 8, 2023

(87) PCT Pub. No.: WO2022/233292
PCT Pub. Date: Nov. 10, 2022

(65) Prior Publication Data
US 2024/0163698 A1 May 16, 2024

(30) Foreign Application Priority Data
May 5, 2021 (WO) ................ PCT/CN2021/091820

(51) Int. Cl.
*H04W 24/00* (2009.01)
*H04B 7/06* (2006.01)
*H04W 24/04* (2009.01)

(52) U.S. Cl.
CPC ........ *H04W 24/04* (2013.01); *H04B 7/06964* (2023.05)

(58) Field of Classification Search
None
See application file for complete search history.

(56) References Cited

U.S. PATENT DOCUMENTS

2019/0229777 A1* 7/2019 Guan ..................... H04B 7/088
2020/0107331 A1* 4/2020 Tsai ..................... H04B 7/0695
(Continued)

FOREIGN PATENT DOCUMENTS

CN 111034338 A 4/2020
CN 116391441 A * 7/2023 ............ H04W 24/08
(Continued)

OTHER PUBLICATIONS

Qualcomm Incorporated: "Enhancements on Multi-Beam Operation", 3GPP Draft, R1-1912968, 3GPP TSG-RAN WG1 Meeting #99, 3rd Generation Partnership Project, Mobile Competence Centre, 650, Route Des Lucioles, F-06921 Sophia-Antipolis Cedex, France, vol. RAN WG1, No. Reno, Nevada, US, Nov. 18, 2019-Nov. 22, 2019, Nov. 9, 2019, pp. 1-19, XP051823730, Sections 2.1, 2.2, 2.3 and 3.
Supplementary European Search Report—EP22798632—Search Authority—Munich—Feb. 11, 2025.
(Continued)

*Primary Examiner* — Brandon M Renner
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network entity, a transmit receive point (TRP)-specific beam failure recovery (BFR) medium access control control element (MAC-CE) indicating a new beam for the UE based at least in part on a TRP with beam failure. The UE may receive, from the network entity, a TRP-specific BFR response based at least in part on the TRP-specific BFR MAC-CE. The UE may determine a subcarrier spacing (SCS) for a TRP-specific BFR beam resetting timing based at least in part on an SCS associated with the TRP-specific BFR response being different than an SCS associated with the TRP with beam failure. Numerous other aspects are described.

30 Claims, 10 Drawing Sheets

500 ⟶

(56) References Cited

U.S. PATENT DOCUMENTS

| | | | | |
|---|---|---|---|---|
| 2021/0067229 A1 | 3/2021 | Ryu et al. | | |
| 2021/0105850 A1 | 4/2021 | Bai et al. | | |
| 2021/0127285 A1 | 4/2021 | Khoshnevisan et al. | | |
| 2021/0297959 A1* | 9/2021 | Zhou | ................. | H04W 74/0833 |
| 2022/0294514 A1* | 9/2022 | Kang | .................... | H04W 76/19 |
| 2023/0232389 A1* | 7/2023 | Shao | .................... | H04L 5/0053 |
| | | | | 370/329 |
| 2023/0337075 A1* | 10/2023 | Zhang | .................. | H04W 36/08 |

FOREIGN PATENT DOCUMENTS

| | | | | | |
|---|---|---|---|---|---|
| CN | | 117157890 A | * | 12/2023 | ......... H04B 7/06964 |
| CN | | 117280726 A | * | 12/2023 | ......... H04B 7/06964 |
| WO | WO-2019193239 A1 | | | 10/2019 | |
| WO | WO-2021025827 | | | 2/2021 | |
| WO | WO-2021059245 A1 | | | 4/2021 | |

OTHER PUBLICATIONS

Ericsson: "[Post109bis-e][933][eMIMO] RRC Open Issues (Ericsson)", 3GPP TSG-RAN WG2 Meeting #110e Tdoc, R2-2004465, Jun. 12, 2020, 50 Pages, the whole document.

International Search Report and Written Opinion—PCT/CN2021/091820—ISA/EPO—Feb. 10, 2022.

International Search Report and Written Opinion—PCT/CN2022/090881—ISA/EPO—Jun. 28, 2022.

Nokia, et al., "Enhancements on Beam Management for Multi-TRP/Panel Transmission", 3GPP TSG RAN WG1 #104-bis-e, R1-2103368, 3rd Generation Partnership Project, Mobile Competence Centre, 650, Route Des Lucioles, F-06921 Sophia-Antipolis Cedex, France, vol. RAN WG1, No. e-Meeting, Apr. 12-Apr. 20, 2021, Apr. 6, 2020, XP051993393, sections 1, 3, 15 Pages, the whole document, pp. 7 ,3.

Samsung, "Enhancements on MIMO for NR", 3GPP TSG RAN Meeting #88e, RP-201255, Jul. 3, 2020 (Jul. 3, 2020), 21 Pages, The Whole Document.

\* cited by examiner

500

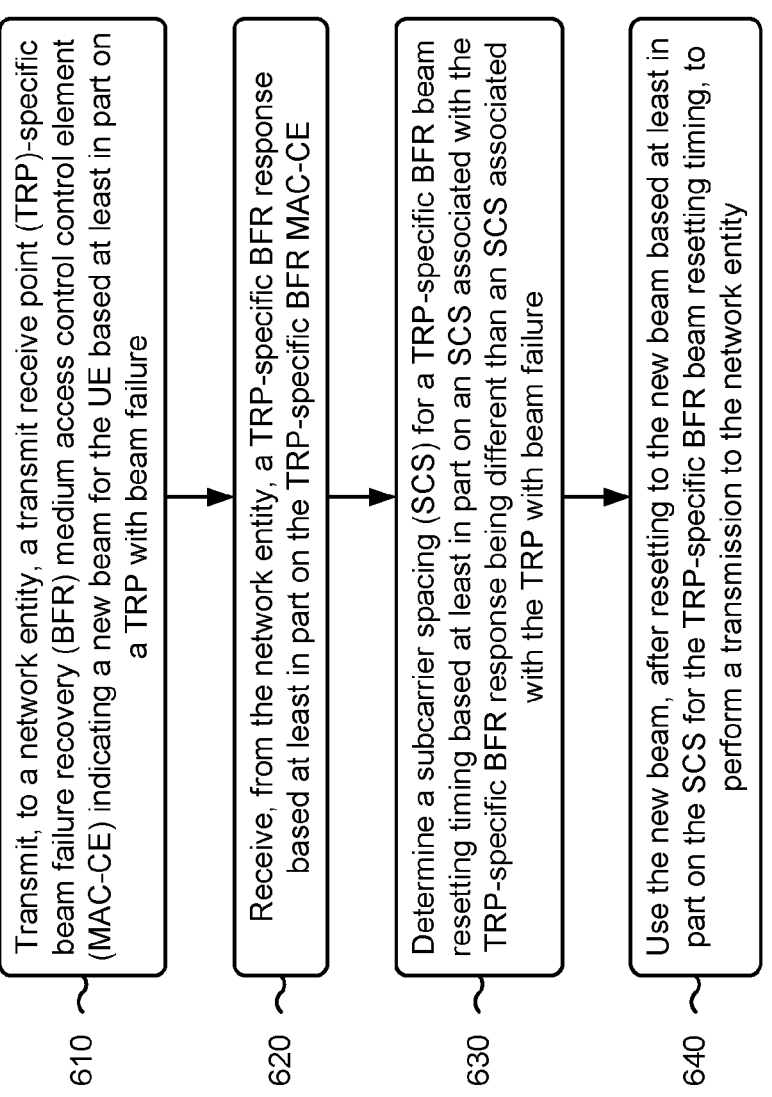

610　Transmit, to a network entity, a transmit receive point (TRP)-specific beam failure recovery (BFR) medium access control control element (MAC-CE) indicating a new beam for the UE based at least in part on a TRP with beam failure 620　Receive, from the network entity, a TRP-specific BFR response based at least in part on the TRP-specific BFR MAC-CE 630　Determine a subcarrier spacing (SCS) for a TRP-specific BFR beam resetting timing based at least in part on an SCS associated with the TRP-specific BFR response being different than an SCS associated with the TRP with beam failure 640　Use the new beam, after resetting to the new beam based at least in part on the SCS for the TRP-specific BFR beam resetting timing, to perform a transmission to the network entity

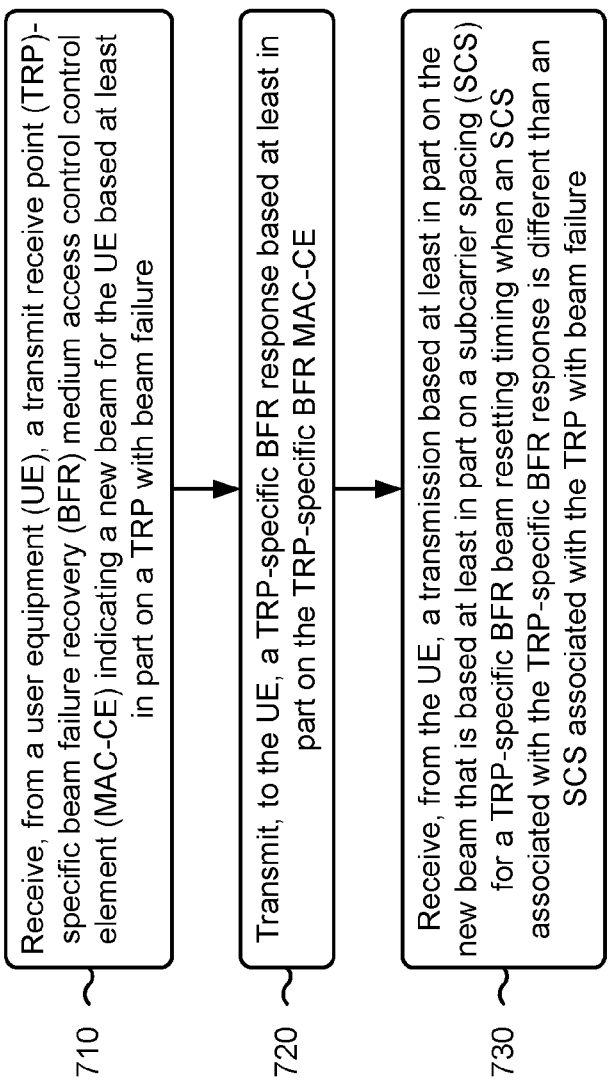

700

710 — Receive, from a user equipment (UE), a transmit receive point (TRP)-specific beam failure recovery (BFR) medium access control control element (MAC-CE) indicating a new beam for the UE based at least in part on a TRP with beam failure 720 — Transmit, to the UE, a TRP-specific BFR response based at least in part on the TRP-specific BFR MAC-CE 730 — Receive, from the UE, a transmission based at least in part on the new beam that is based at least in part on a subcarrier spacing (SCS) for a TRP-specific BFR beam resetting timing when an SCS associated with the TRP-specific BFR response is different than an SCS associated with the TRP with beam failure

FIG. 7

RESETTING A BEAM BASED AT LEAST IN PART ON A SUBCARRIER SPACING

CROSS-REFERENCE TO RELATED APPLICATIONS

This Patent Application is a 371 national stage of PCT Application No. PCT/CN2022/090881 filed on May 5, 2022, entitled "RESETTING A BEAM BASED AT LEAST IN PART ON A SUBCARRIER SPACING," which claims priority to Patent Cooperation Treaty (PCT) Patent Application No. PCT/CN2021/091820, filed on May 5, 2021, entitled "RESETTING A BEAM BASED AT LEAST IN PART ON A SUBCARRIER SPACING," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for resetting a beam based at least in part on a subcarrier spacing (SCS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: transmit, to a network entity, a transmit receive point (TRP)-specific beam failure recovery (BFR) medium access control control element (MAC-CE) indicating a new beam for the UE based at least in part on a TRP with beam failure; receive, from the network entity, a TRP-specific BFR response based at least in part on the TRP-specific BFR MAC-CE; determine a subcarrier spacing (SCS) for a TRP-specific BFR beam resetting timing based at least in part on an SCS associated with the TRP-specific BFR response being different than an SCS associated with the TRP with beam failure; and use the new beam, after resetting to the new beam based at least in part on the SCS for the TRP-specific BFR beam resetting timing, to perform a transmission to the network entity.

In some aspects, a network entity for wireless communication includes a memory and one or more processors, coupled to the memory, configured to: receive, from a UE, a TRP-specific BFR MAC-CE indicating a new beam for the UE based at least in part on a TRP with beam failure; transmit, to the UE, a TRP-specific BFR response based at least in part on the TRP-specific BFR MAC-CE; and receive, from the UE, a transmission based at least in part on the new beam that is based at least in part on an SCS for a TRP-specific BFR beam resetting timing when an SCS associated with the TRP-specific BFR response is different than an SCS associated with the TRP with beam failure.

In some aspects, a method of wireless communication performed by a UE includes transmitting, to a network entity, a TRP-specific BFR MAC-CE indicating a new beam for the UE based at least in part on a TRP with beam failure; receiving, from the network entity, a TRP-specific BFR response based at least in part on the TRP-specific BFR MAC-CE; determining an SCS for a TRP-specific BFR beam resetting timing based at least in part on an SCS associated with the TRP-specific BFR response being different than an SCS associated with the TRP with beam failure; and using the new beam, after resetting to the new beam based at least in part on the SCS for the TRP-specific BFR beam resetting timing, to perform a transmission to the network entity.

In some aspects, a method of wireless communication performed by a network entity includes receiving, from a UE, a TRP-specific BFR MAC-CE indicating a new beam for the UE based at least in part on a TRP with beam failure; transmitting, to the UE, a TRP-specific BFR response based at least in part on the TRP-specific BFR MAC-CE; and receiving, from the UE, a transmission based at least in part on the new beam that is based at least in part on an SCS for a TRP-specific BFR beam resetting timing when an SCS associated with the TRP-specific BFR response is different than an SCS associated with the TRP with beam failure.

In some aspects, a non-transitory computer-readable medium storing a set of instructions for wireless communication includes one or more instructions that, when executed by one or more processors of a UE, cause the UE to: transmit, to a network entity, a TRP-specific BFR MAC-CE indicating a new beam for the UE based at least in part on a TRP with beam failure; receive, from the network entity, a TRP-specific BFR response based at least in part on the TRP-specific BFR MAC-CE; determine an SCS for a TRP-specific BFR beam resetting timing based at least in part on an SCS associated with the TRP-specific BFR response being different than an SCS associated with the TRP with beam failure; and use the new beam, after resetting to the new beam based at least in part on the SCS for the TRP-specific BFR beam resetting timing, to perform a transmission to the network entity.

In some aspects, a non-transitory computer-readable medium storing a set of instructions for wireless communication includes one or more instructions that, when executed by one or more processors of a network entity, cause the network entity to: receive, from a UE, a TRP-specific BFR MAC-CE indicating a new beam for the UE based at least in part on a TRP with beam failure; transmit, to the UE, a TRP-specific BFR response based at least in part on the TRP-specific BFR MAC-CE; and receive, from the UE, a transmission based at least in part on the new beam that is based at least in part on an SCS for a TRP-specific BFR beam resetting timing when an SCS associated with the TRP-specific BFR response is different than an SCS associated with the TRP with beam failure.

In some aspects, an apparatus for wireless communication includes means for transmitting, to a network entity, a TRP-specific BFR MAC-CE indicating a new beam for the apparatus based at least in part on a TRP with beam failure; means for receiving, from the network entity, a TRP-specific BFR response based at least in part on the TRP-specific BFR MAC-CE; means for determining an SCS for a TRP-specific BFR beam resetting timing based at least in part on an SCS associated with the TRP-specific BFR response being different than an SCS associated with the TRP with beam failure; and means for using the new beam, after resetting to the new beam based at least in part on the SCS for the TRP-specific BFR beam resetting timing, to perform a transmission to the network entity.

In some aspects, an apparatus for wireless communication includes means for receiving, from a UE, a TRP-specific BFR MAC-CE indicating a new beam for the UE based at least in part on a TRP with beam failure; means for transmitting, to the UE, a TRP-specific BFR response based at least in part on the TRP-specific BFR MAC-CE; and means for receiving, from the UE, a transmission based at least in part on the new beam that is based at least in part on an SCS for a TRP-specific BFR beam resetting timing when an SCS associated with the TRP-specific BFR response is different than an SCS associated with the TRP with beam failure.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with resetting a beam based at least in part on an SCS, in accordance with the present disclosure.

5

Figure 10:
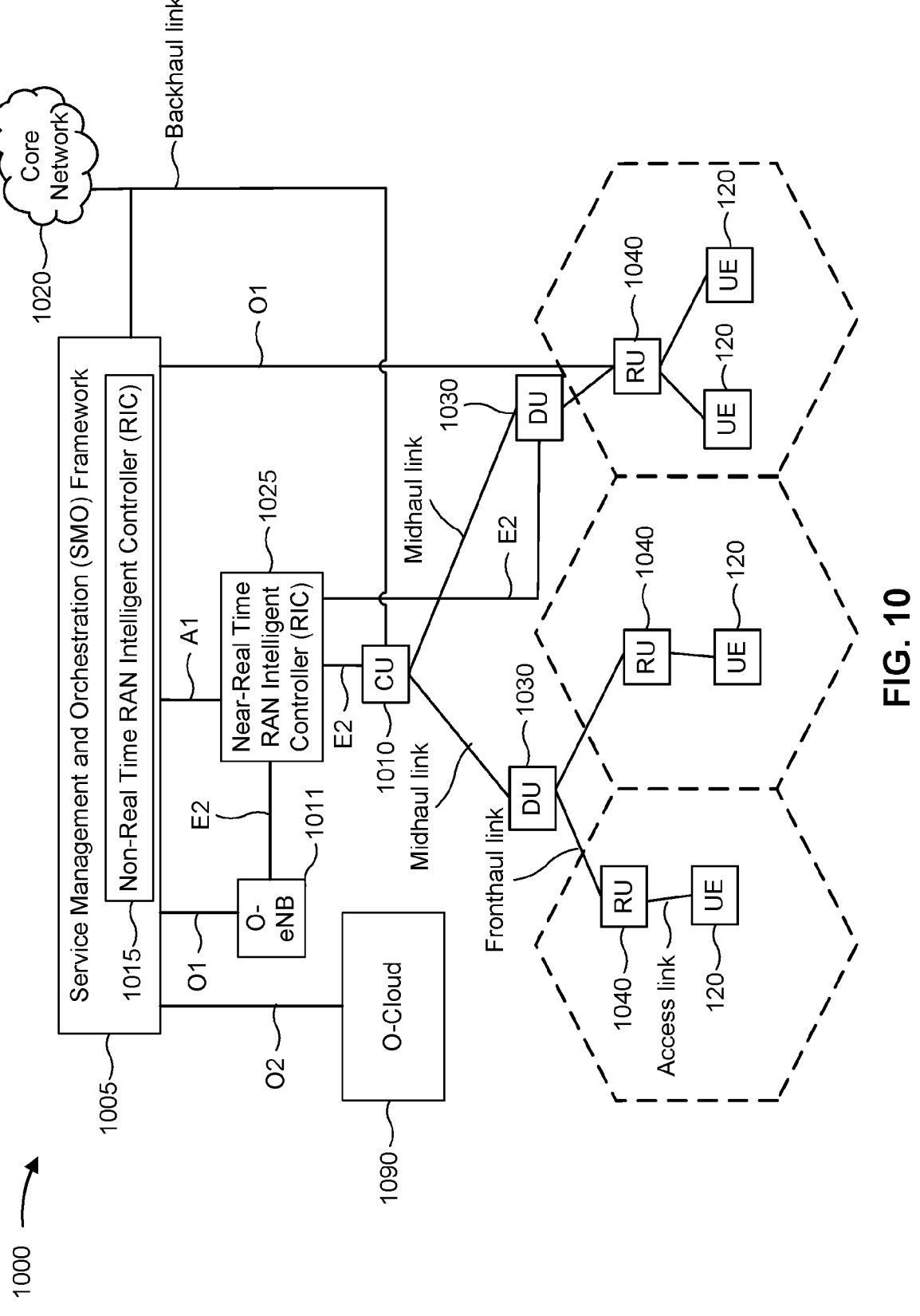

FIG. 10 is a diagram illustrating an example of a disaggregated base station architecture, in accordance with the present disclosure.

DETAILED DESCRIPTION

A transmit receive point (TRP)-specific beam failure recovery (BFR) beam resetting timing may be X symbols after a UE receives a TRP-specific BFR response in downlink control information (DCI) (e.g., a scheduling DCI) from a network entity. In some cases, the TRP-specific BFR response indicated in the DCI may be associated with a subcarrier spacing (SCS) that is different than an SCS associated with a failed TRP. In other words, a component carrier associated with transmitting/receiving the DCI and a component carrier associated with the failed TRP may be associated with different SCSs. The UE may not be configured to determine an SCS associated with the X symbols from the different SCSs associated with the DCI and the failed TRP, respectively. Thus, the UE may need to determine the SCS for the X symbols when the component carrier associated with transmitting/receiving the DCI and the component carrier associated with the failed TRP are associated with different SCSs.

In various aspects of techniques and apparatuses described herein, the UE may transmit, to the network entity, a TRP-specific BFR MAC-CE indicating a new beam for the UE based at least in part on a TRP with beam failure. The UE may receive, from the network entity, a TRP-specific BFR response based at least in part on the TRP-specific BFR MAC-CE. The UE may determine an SCS for a TRP-specific BFR beam resetting timing based at least in part on an SCS associated with the TRP-specific BFR response being different than an SCS associated with the TRP with beam failure. The UE may use the new beam, after resetting to the new beam based at least in part on the SCS for the TRP-specific BFR beam resetting timing, to perform a transmission to the network entity. As a result, the UE may be able to determine the SCS for the TRP-specific BFR beam resetting timing when a component carrier associated with DCI indicating the TRP-specific BFR response is different than a component carrier associated with the TRP having the beam failure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
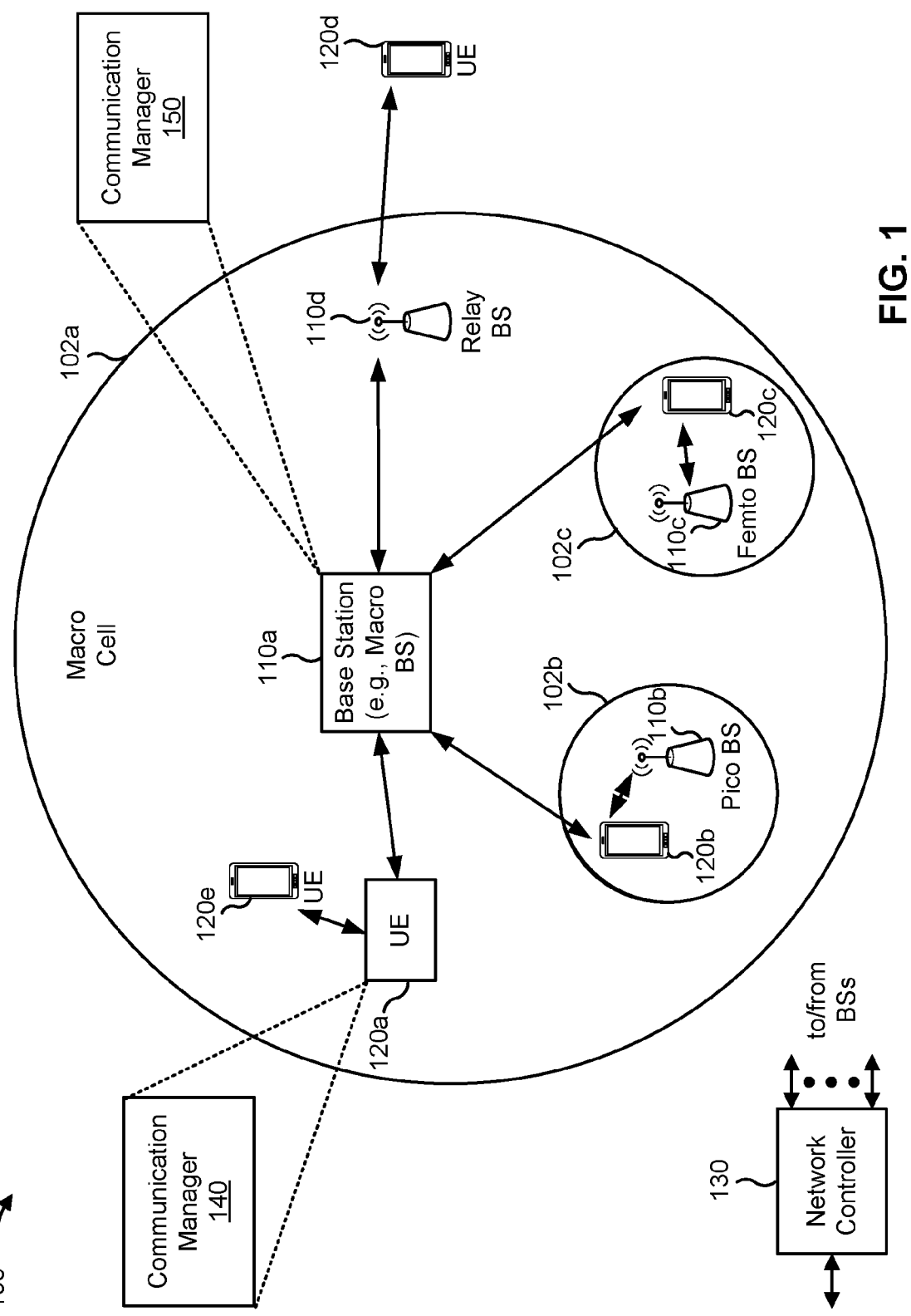
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, to a network entity, a TRP-specific BFR MAC-CE indicating a new beam for the UE based at least in part on a TRP with beam failure; receive, from the network entity, a TRP-specific BFR response based at least in part on the TRP-specific BFR MAC-CE; determine an SCS for a TRP-specific BFR beam resetting timing based at least in part on an SCS associated with the TRP-specific BFR response being different than an SCS associated with the TRP with beam failure; and use the new beam, after resetting to the new beam based at least in part on the SCS for the TRP-specific BFR beam resetting timing, to perform a transmission to the network entity. Additionally, or alternatively, the communication manager 140 may perform one or more other operations described herein.

In some aspects, a network entity (e.g., base station 110) may include a communication manager 150. As described in more detail elsewhere herein, the communication manager 150 may receive, from a UE, a TRP-specific BFR MAC-CE indicating a new beam for the UE based at least in part on a TRP with beam failure; transmit, to the UE, a TRP-specific BFR response based at least in part on the TRP-specific BFR MAC-CE; and receive, from the UE, a transmission based at least in part on the new beam that is based at least in part on an SCS for a TRP-specific BFR beam resetting timing when an SCS associated with the TRP-specific BFR response is different than an SCS associated with the TRP with beam failure. Additionally, or alternatively, the communication manager 150 may perform one or more other operations described herein.

As indicated above, FIG. 1 is provided as an example. Other examples may differ from what is described with regard to FIG. 1.

Figure 2:
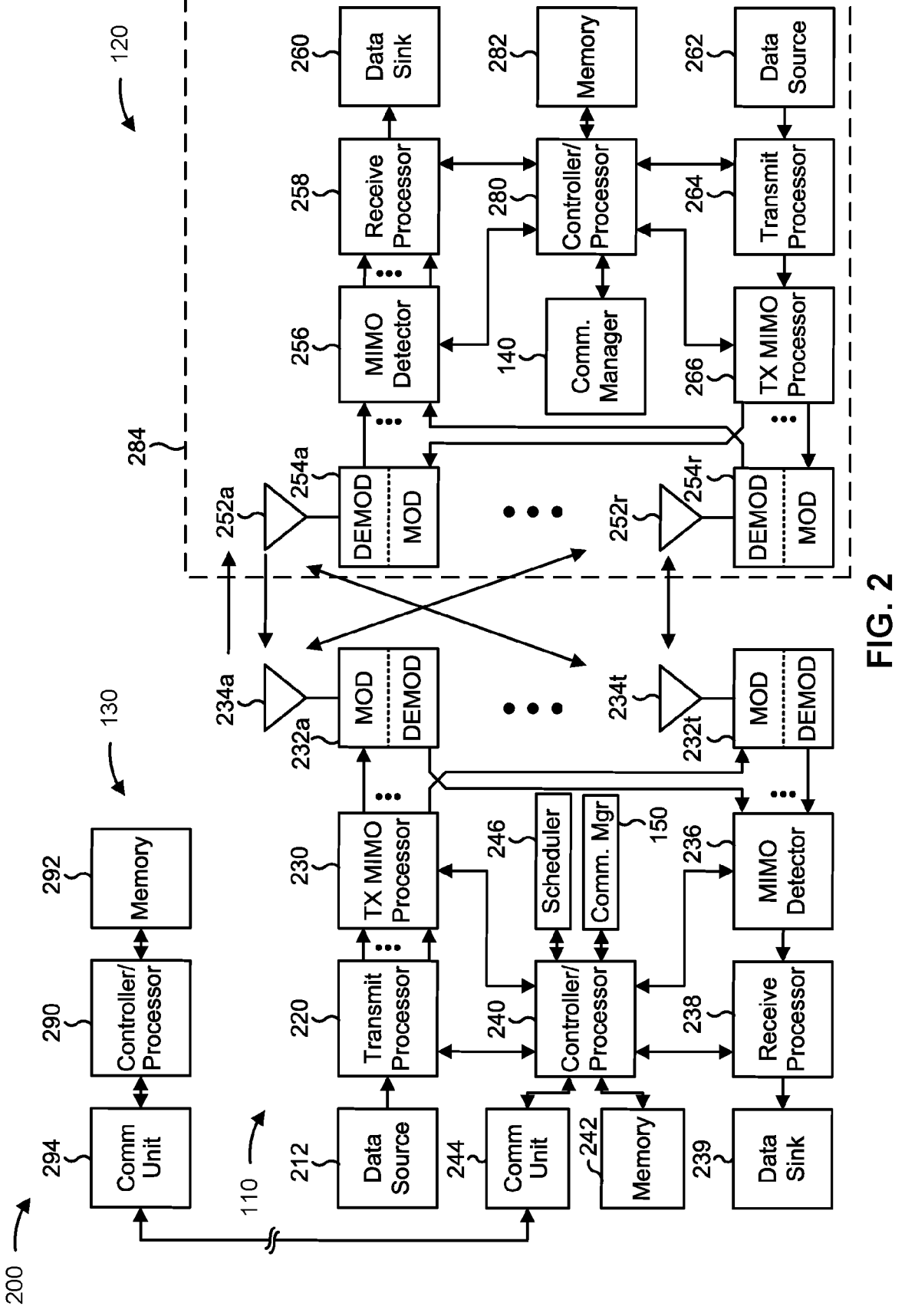
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with resetting a beam based at least in part on an SCS, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a network entity, a TRP-specific BFR MAC-CE indicating a new beam for the UE based at least in part on a TRP with beam failure; means for receiving, from the network entity, a TRP-specific BFR response based at least in part on the TRP-specific BFR MAC-CE; means for determining an SCS for a TRP-specific BFR beam resetting timing based at least in part on an SCS associated with the TRP-specific BFR response being different than an SCS associated with the TRP with beam failure; and/or means for using the new beam, after resetting to the new beam based at least in part on the SCS for the TRP-specific BFR beam resetting timing, to perform a transmission to the network entity. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for receiving, from a UE, a TRP-specific BFR MAC-CE indicating a new beam for the UE based at least in part on a TRP with beam failure; means for transmitting, to the UE, a TRP-specific BFR response based at least in part on the TRP-specific BFR MAC-CE; and/or means for receiving, from the UE, a transmission based at least in part on the new beam that is based at least in part on an SCS for a TRP-specific BFR beam resetting timing when an SCS associated with the TRP-specific BFR response is different than an SCS associated with the TRP with beam failure. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE may detect a beam failure associated with a secondary cell (SCell). The UE may transmit, to a network entity (e.g., a base station), an SCell BFR MAC-CE based at least in part on a failed SCell. The SCell BFR MAC-CE may indicate beam failure information. The beam failure information may indicate a new beam for the UE. The new beam may be a new candidate beam, and an indication of the new beam may be reported to the network entity. The network entity may transmit, to the UE, an SCell BFR response. The UE may reset to the new beam reported in the SCell BFR MAC-CE after receiving the SCell BFR response from the network entity.

Beams for a plurality of control resource sets (CORE-SETs) (e.g., all CORESETs) on the failed SCell may be reset to the new beam, as reported in the SCell BFR MAC-CE, 28 symbols after the UE receives the SCell BFR response from the network entity. In other words, a time offset of 28 symbols may separate a reception of the SCell BFR response and a resetting to the new beam. The 28 symbols may correspond to an SCell BFR beam resetting timing. The SCell BFR response may be indicated in DCI scheduling an uplink grant for a same hybrid automatic repeat request (HARQ) process identifier (ID) as compared to the SCell BFR MAC-CE (e.g., a same HARQ process ID as the one carrying the SCell BFR MAC-CE).

In some cases, the SCell BFR response indicated in the DCI may be transmitted from a cell (e.g., a primary cell) with an SCS different than an SCS of the failed SCell. In other words, the SCS of the cell that transmits the SCell BFR response may be different than the SCS of the failed SCell. The UE may apply the new beam to the plurality of CORESETs 28 symbols after receiving the SCell BFR response, since the 28 symbols is based at least in part on a smallest SCS of the cell transmitting/receiving the SCell BFR response and the failed cell.

Figure 3:
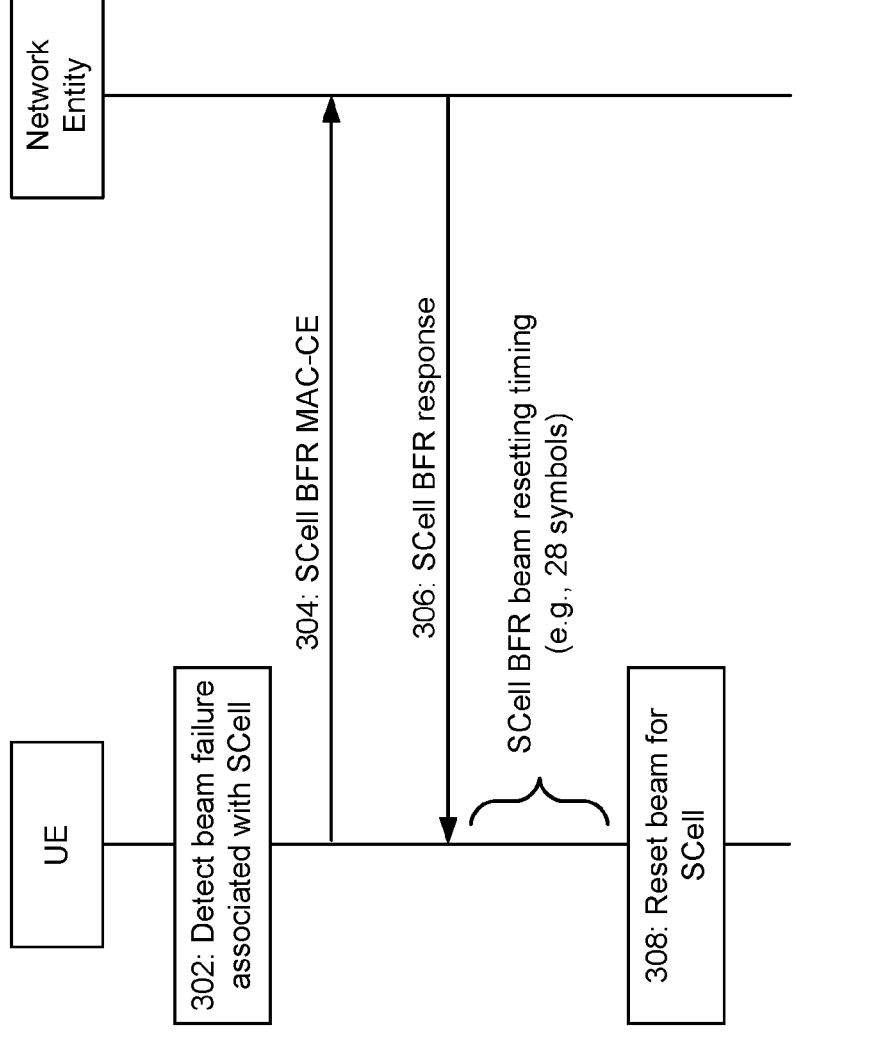
FIG. 3 is a diagram illustrating an example of resetting a beam for a secondary cell (SCell), in accordance with the present disclosure.

FIG. 3 is a diagram illustrating an example 300 of resetting a beam for an SCell, in accordance with the present disclosure. As shown in FIG. 3, example 300 includes communication between a UE (e.g., UE 120) and a network entity (e.g., base station 110). In some aspects, the UE and the network entity may be included in a wireless network, such as wireless network 100.

As shown by reference number 302, the UE may detect a beam failure associated with an SCell. The UE may detect the beam failure based at least in part on a beam measurement (e.g., an RSRP measurement) of a beam associated with the SCell not satisfying a threshold (e.g., the beam measurement may go below a certain threshold).

As shown by reference number 304, the UE may transmit, to the network entity, an SCell BFR MAC-CE. The UE may transmit the SCell BFR MAC-CE based at least in part on the beam failure associated with the SCell. The SCell BFR MAC-CE may indicate beam failure information. The beam failure information may indicate a new beam for the UE (e.g., a newly identified beam for the UE). The new beam may be a new candidate beam, and an indication of the new beam may be reported to the network entity.

As shown by reference number 306, the network entity may transmit, to the UE, an SCell BFR response. The network entity may transmit the SCell BFR response based at least in part on the SCell BFR MAC-CE.

As shown by reference number 308, the UE may reset the beam for the SCell. In other words, the UE may reset to the new beam indicated in the SCell BFR MAC-CE. A first time at which the UE receives the SCell BFR response, and a second time at which the UE resets to the new beam may be defined by an SCell BFR beam resetting timing, which may be equal to 28 symbols.

As indicated above, FIG. 3 is provided as an example. Other examples may differ from what is described with regard to FIG. 3.

For TRP-specific BFR, a UE may report an individual failed TRP for early beam reselection for that failed TRP, rather than triggering a cell-level BFR when a plurality of TRPs (e.g., all TRPs) fail. The UE may report a TRP-specific BFR MAC-CE to a network entity. The TRP-specific BFR MAC-CE may indicate a new beam. The new beam may be a new candidate beam, and an indication of the new beam may be reported to the network entity. The UE may receive a TRP-specific BFR response from the network entity. The UE may reset to the new beam reported in the TRP-specific BFR MAC-CE after receiving the TRP-specific BFR response from the network entity.

Beams for a plurality of CORESETs (e.g., all CORE-SETs) associated with the failed TRP may be reset to the new beam, as reported for the failed TRP in the TRP-specific BFR MAC-CE, X symbols after the UE receives the TRP-specific BFR response from the network entity, where X is a positive integer. In other words, a time offset of X symbols may separate a reception of the TRP-specific BFR response and a resetting to the new beam. The X symbols may correspond to a TRP-specific BFR beam resetting timing. The TRP-specific BFR response may be indicated in DCI scheduling an uplink grant for a same HARQ process ID as compared to the TRP-specific BFR MAC-CE (e.g., a same HARQ process ID as the one carrying the TRP-specific BFR MAC-CE).

Figure 4:
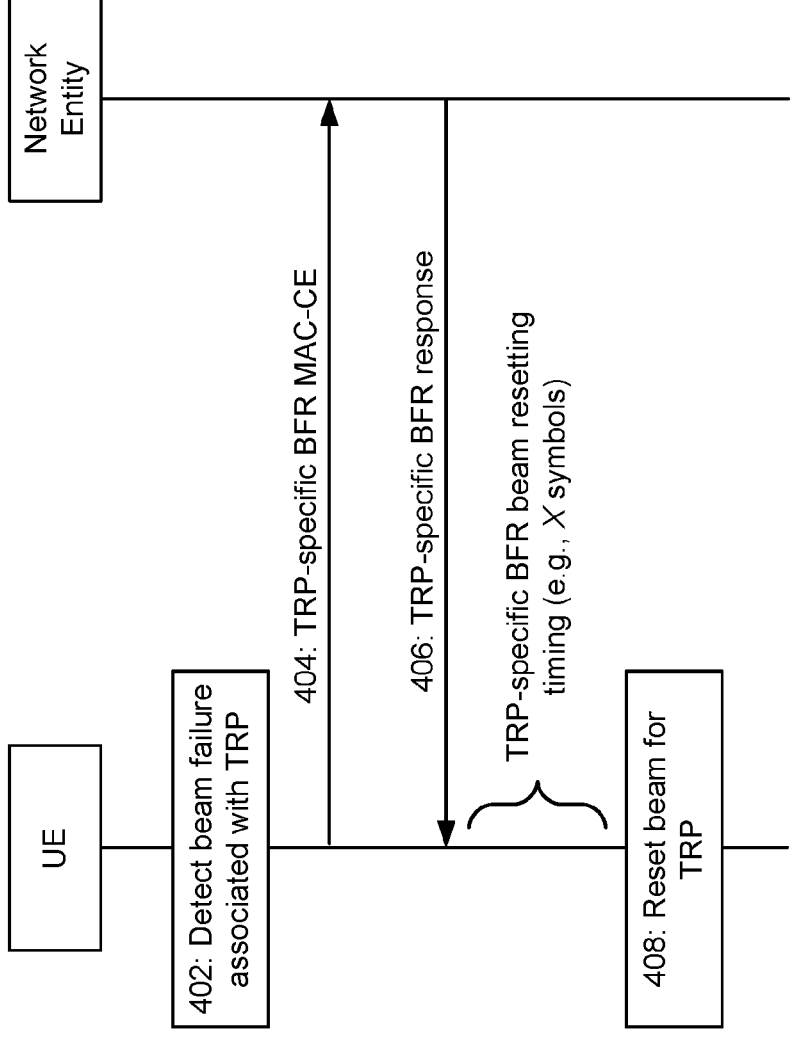
FIG. 4 is a diagram illustrating an example of resetting a beam for a transit receive point (TRP), in accordance with the present disclosure.

FIG. 4 is a diagram illustrating an example 400 of resetting a beam for a TRP, in accordance with the present disclosure. As shown in FIG. 4, example 400 includes communication between a UE (e.g., UE 120) and a network entity (e.g., base station 110). In some aspects, the UE and the network entity may be included in a wireless network, such as wireless network 100.

As shown by reference number 402, the UE may detect a beam failure associated with a TRP. The UE may detect the beam failure based at least in part on a beam measurement (e.g., an RSRP measurement) of a beam associated with the TRP not satisfying a threshold (e.g., the beam measurement may go below a certain threshold).

As shown by reference number 404, the UE may transmit, to the network entity, a TRP-specific BFR MAC-CE. The UE may transmit the TRP-specific BFR MAC-CE based at least in part on the beam failure associated with the TRP. The TRP-specific BFR MAC-CE may indicate beam failure information. The beam failure information may indicate a new beam for the UE (e.g., a newly identified beam for the UE). The new beam may be a new candidate beam, and an indication of the new beam may be reported to the network entity.

As shown by reference number 406, the network entity may transmit, to the UE, a TRP-specific BFR response. The network entity may transmit the TRP-specific BFR response based at least in part on the TRP-specific BFR MAC-CE.

As shown by reference number 408, the UE may reset the beam for the TRP. In other words, the UE may reset to the new beam indicated in the TRP-specific BFR MAC-CE. A first time at which the UE receives the TRP-specific BFR response and a second time at which the UE resets to the new beam may be defined by a TRP-specific BFR beam resetting timing, which may be equal to X symbols, where X is a positive integer.

As indicated above, FIG. 4 is provided as an example. Other examples may differ from what is described with regard to FIG. 4.

A TRP-specific BFR beam resetting timing may be X symbols after a UE receives a TRP-specific BFR response in DCI (e.g., a scheduling DCI) from a network entity. In some cases, the TRP-specific BFR response indicated in the DCI may be associated with an SCS that is different than an SCS associated with the failed TRP. In other words, a component carrier associated with transmitting/receiving the DCI and a component carrier associated with the failed TRP may be associated with different SCSs. The UE may not be configured to determine an SCS associated with the X symbols from the different SCSs associated with the DCI and the failed TRP, respectively. Thus, the UE may need to determine the SCS for the X symbols when the component carrier associated with transmitting/receiving the DCI and the component carrier associated with the failed TRP are associated with different SCSs.

In various aspects of techniques and apparatuses described herein, a UE may transmit, to a network entity, a TRP-specific BFR MAC-CE indicating a new beam for the UE based at least in part on a TRP with beam failure. The UE may receive, from the network entity, a TRP-specific BFR response based at least in part on the TRP-specific BFR MAC-CE. The UE may determine an SCS for a TRP-specific BFR beam resetting timing based at least in part on an SCS associated with the TRP-specific BFR response being different than an SCS associated with the TRP with beam failure. The UE may use the new beam, after resetting to the new beam based at least in part on the SCS for the TRP-specific BFR beam resetting timing, to perform a transmission to the network entity. As a result, the UE may be able to determine the SCS for the TRP-specific BFR beam resetting timing when a component carrier associated with DCI indicating the TRP-specific BFR response is different than a component carrier associated with the TRP having the beam failure.

Figure 5:
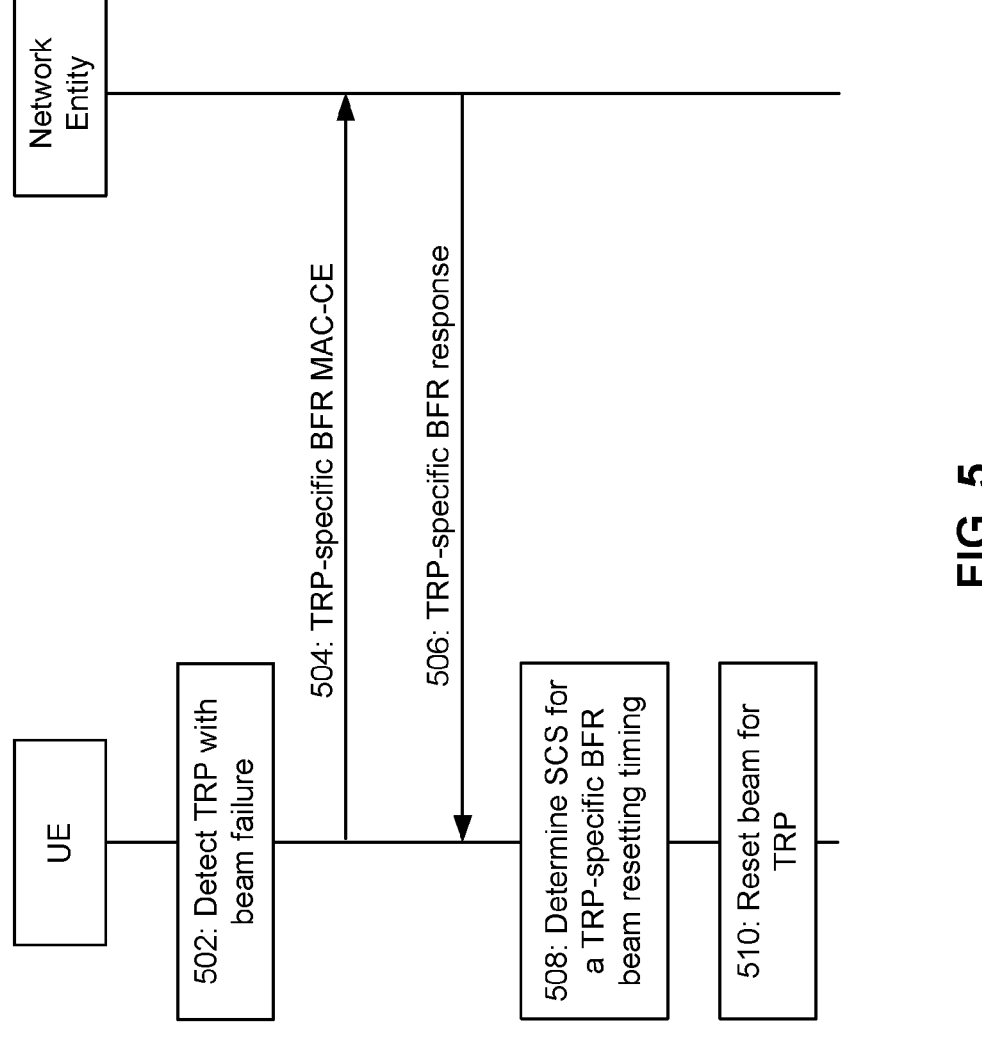
FIG. 5 is a diagram illustrating an example associated with resetting a beam based at least in part on a subcarrier spacing (SCS), in accordance with the present disclosure.

FIG. 5 is a diagram illustrating an example 500 associated with resetting a beam based at least in part on an SCS, in accordance with the present disclosure. As shown in FIG. 5, example 500 includes communication between a UE (e.g., UE 120) and a network entity (e.g., base station 110). In some aspects, the UE and the network entity may be included in a wireless network, such as wireless network 100.

As shown by reference number 502, the UE may detect a TRP with beam failure. The UE may detect the TRP with beam failure based at least in part on a beam measurement (e.g., an RSRP measurement or a hypothetical block error rate (BLER)) of a beam associated with the TRP not satisfying a threshold (e.g., the beam measurement may become worse than a certain threshold).

As shown by reference number 504, the UE may transmit, to the network entity, a TRP-specific BFR MAC-CE. The UE may transmit the TRP-specific BFR MAC-CE based at least in part on the TRP with beam failure. The TRP-specific BFR MAC-CE may indicate beam failure information. The beam failure information may indicate a new beam for the UE (e.g., a newly identified beam for the UE), and failed TRP information. The new beam may be a new candidate beam, and an indication of the new beam may be reported to the network entity. A single TRP-specific BFR MAC-CE may indicate beam failure information for multiple TRPs in multiple component carriers.

As shown by reference number 506, the UE may receive, from the network entity, a TRP-specific BFR response. The network entity may transmit the TRP-specific BFR response based at least in part on the TRP-specific BFR MAC-CE. The UE may receive the TRP-specific BFR response in DCI (e.g., a scheduling DCI) from the network entity.

As shown by reference number 508, the UE may determine an SCS for a TRP-specific BFR beam resetting timing based at least in part on an SCS associated with the TRP-specific BFR response being different than an SCS associated with the TRP with beam failure. The TRP-specific BFR beam resetting timing may be associated with a quantity of symbols (e.g., X symbols). The TRP-specific BFR beam resetting timing may span a first time at which the UE receives the TRP-specific BFR response and a second time at which the UE resets to the new beam. In some aspects, the SCS may be for the X symbols of the TRP-specific BFR beam resetting.

In some aspects, the SCS for the TRP-specific BFR beam resetting timing may be a largest SCS or a smallest SCS between the SCS associated with the TRP-specific BFR response and the SCS associated with the TRP with beam failure. In other words, the SCS may be the largest/smallest SCS of a DCI SCS (e.g., an SCS associated with transmitting the DCI indicating the TRP-specific BFR response) and a failed TRP SCS (e.g., an SCS associated with the TRP with beam failure).

In some aspects, the SCS for the TRP-specific BFR beam resetting timing may be a largest SCS or a smallest SCS between the SCS associated with the TRP-specific BFR response and a plurality of SCSs associated with a plurality of TRPs with beam failures. The plurality of TRPs may be associated with multiple component carriers. The TRP-specific BFR MAC-CE may indicate each of the multiple component carriers associated with the plurality of TRPs with beam failures. In other words, the SCS may be the largest/smallest SCS of the DCI SCS and a plurality of failed TRP SCSs (e.g., all failed TRP SCSs) on multiple component carriers when the TRP-specific BFR MAC-CE indicates each of the multiple component carriers having failed TRPs.

In some aspects, the SCS for the TRP-specific BFR beam resetting timing may be a largest SCS or a smallest SCS between the SCS associated with the TRP-specific BFR response and a plurality of SCSs associated with a plurality of TRPs with beam failures. The plurality of TRPs may be associated with multiple component carriers. A joint cell-level and the TRP-specific BFR MAC-CE may indicate each of the multiple component carriers associated with the plurality of TRPs with beam failures or may indicate failed component carriers. In some aspects, the SCS for the TRP-specific BFR beam resetting timing may be a largest SCS or a smallest SCS between the SCS associated with the TRP-specific BFR response and a plurality of SCSs associated with a plurality of component carriers with beam failures. In other words, the SCS may be the largest/smallest SCS of the DCI SCS and a plurality of failed TRP SCSs or component carrier SCSs on multiple component carriers when the joint cell-level and the TRP-specific BFR MAC-CE indicate each of the multiple component carriers having failed TRPs and/or failed component carriers.

In some aspects, the multiple component carriers may be associated with an SCell, a primary cell (PCell), or a primary secondary cell (PSCell). In some aspects, the joint cell-level and the TRP-specific BFR MAC-CE may indicate whether a certain component carrier is associated with a cell-level beam failure and/or a TRP-level beam failure. The joint cell-level and the TRP-specific BFR MAC-CE may indicate a corresponding component carrier index and/or a TRP index.

In some aspects, the SCS associated with the TRP-specific BFR response may correspond to an SCS of an active bandwidth part of a component carrier on which DCI indicating the TRP-specific BFR response is received. In other words, the DCI SCS may be associated with the SCS of the active bandwidth part of the component carrier where the DCI is received as the TRP-specific BFR response.

In some aspects, the SCS associated with the TRP with beam failure may correspond to an SCS of an active bandwidth part of a component cater associated with the TRP with beam failure. In other words, the failed TRP SCS may be associated with the SCS of the active bandwidth part of the component carrier on which the failed TRP is identified.

In some aspects, an SCS associated with a component carrier associated with a beam failure, from the plurality of SCSs associated with the plurality of component carriers with beam failures, may correspond to an SCS of an active bandwidth part of the component carrier associated with the beam failure. In other words, the failed component carrier SCS may refer to an SCS of the active bandwidth part of the failed component carrier.

In some aspects, the TRP-specific BFR beam resetting timing may be for CORESETs, physical downlink shared channels (PDSCHs), channel state information reference signals (CSI-RSs), physical uplink control channels (PUCCHs), physical uplink shared channels (PUSCH), or sounding reference signals (SRSs) associated with the TRP with beam failure or a component carrier associated with the beam failure. In other words, the X symbols of the TRP-specific BFR beam resetting timing may be for CORESETs, PDSCHs, CSI-RSs, PUCCHs, PUSCHs, and/or SRSs, associated with the failed TRP or failed component carrier.

As shown by reference number 510, the UE may reset a beam for the TRP. The UE may reset the beam to the new beam. The UE may reset to the new beam based at least in part on the SCS for the TRP-specific BFR beam resetting timing. In some aspects, the UE may perform a transmission to the network entity using the new beam that is reset based at least in part on the SCS for the TRP-specific BFR beam resetting timing.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with resetting a beam based at least in part on an SCS.

As shown in FIG. 6, in some aspects, process 600 may include transmitting, to a network entity, a TRP-specific BFR MAC-CE indicating a new beam for the UE based at least in part on a TRP with beam failure (block 610). For example, the UE (e.g., using communication manager 140 and/or transmission component 804, depicted in FIG. 8) may transmit, to a network entity, a TRP-specific BFR MAC-CE indicating a new beam for the UE based at least in part on a TRP with beam failure, as described above.

As further shown in FIG. 6, in some aspects, process 600 may include receiving, from the network entity, a TRP-specific BFR response based at least in part on the TRP-specific BFR MAC-CE (block 620). For example, the UE (e.g., using communication manager 140 and/or reception component 802, depicted in FIG. 8) may receive, from the network entity, a TRP-specific BFR response based at least in part on the TRP-specific BFR MAC-CE, as described above.

As further shown in FIG. 6, in some aspects, process 600 may include determining an SCS for a TRP-specific BFR beam resetting timing based at least in part on an SCS associated with the TRP-specific BFR response being different than an SCS associated with the TRP with beam failure (block 630). For example, the UE (e.g., using communication manager 140 and/or determination component 808, depicted in FIG. 8) may determine an SCS for a TRP-specific BFR beam resetting timing based at least in part on an SCS associated with the TRP-specific BFR response being different than an SCS associated with the TRP with beam failure, as described above.

As further shown in FIG. 6, in some aspects, process 600 may include using the new beam, after resetting to the new beam based at least in part on the SCS for the TRP-specific BFR beam resetting timing, to perform a transmission to the network entity (block 640). For example, the UE (e.g., using communication manager 140 and/or transmission component 804, depicted in FIG. 8) may use the new beam, after resetting to the new beam based at least in part on the SCS for the TRP-specific BFR beam resetting timing, to perform a transmission to the network entity, as described above.

Process 600 may include additional aspects, such as any single aspect or any combination of aspects described below and/or in connection with one or more other processes described elsewhere herein.

In a first aspect, process 600 includes detecting the TRP with beam failure based at least in part on a beam measurement of a beam associated with the TRP not satisfying a threshold.

In a second aspect, alone or in combination with the first aspect, receiving the TRP-specific BFR response comprises receiving the TRP-specific BFR response in DCI.

In a third aspect, alone or in combination with one or more of the first and second aspects, the TRP-specific BFR beam resetting timing is associated with a quantity of symbols.

In a fourth aspect, alone or in combination with one or more of the first through third aspects, the TRP-specific BFR beam resetting timing spans a first time at which the UE receives the TRP-specific BFR response and a second time at which the UE resets to the new beam.

In a fifth aspect, alone or in combination with one or more of the first through fourth aspects, the SCS for the TRP-specific BFR beam resetting timing is a largest SCS or a smallest SCS between the SCS associated with the TRP-specific BFR response and the SCS associated with the TRP with beam failure.

In a sixth aspect, alone or in combination with one or more of the first through fifth aspects, the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and wherein the TRP-specific BFR MAC-CE indicates each of the multiple component carriers associated with the plurality of TRPs with beam failures.

In a seventh aspect, alone or in combination with one or more of the first through sixth aspects, the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the TRP-specific BFR MAC-CE indicates each of the multiple component carriers associated with the plurality of TRPs with beam failures or indicates failed component carriers.

In an eighth aspect, alone or in combination with one or more of the first through seventh aspects, the multiple component carriers are associated with one or more of an SCell, a PCell, or a PSCell.

In a ninth aspect, alone or in combination with one or more of the first through eighth aspects, the joint cell-level and the TRP-specific BFR MAC-CE indicate whether a certain component carrier is associated with one or more of a cell-level beam failure or a TRP-level beam failure, and wherein the joint cell-level and the TRP-specific BFR MAC-CE indicate one or more of a corresponding component carrier index or a TRP index.

In a tenth aspect, alone or in combination with one or more of the first through ninth aspects, the SCS for the TRP-specific BFR beam resetting timing is a largest SCS or a smallest SCS between the SCS associated with the TRP-specific BFR response and a plurality of SCSs associated with a plurality of component carriers with beam failures.

In an eleventh aspect, alone or in combination with one or more of the first through tenth aspects, an SCS associated with a component carrier with a beam failure, from the plurality of SCSs associated with the plurality of component carriers with beam failures, corresponds to an SCS of an active bandwidth part of the component carrier associated with the beam failure.

In a twelfth aspect, alone or in combination with one or more of the first through eleventh aspects, the SCS associated with the TRP-specific BFR response corresponds to an SCS of an active bandwidth part of a component carrier on which DCI indicating the TRP-specific BFR response is received.

In a thirteenth aspect, alone or in combination with one or more of the first through twelfth aspects, the SCS associated with the TRP with beam failure corresponds to an SCS of an active bandwidth part of a component carrier associated with the TRP with beam failure.

In a fourteenth aspect, alone or in combination with one or more of the first through thirteenth aspects, the TRP-specific BFR beam resetting timing may be for one or more of CORESETs, PDSCHs, CSI-RSs, PUCCHs, PUSCHs, or SRSs associated with the TRP with beam failure or a component carrier associated with the beam failure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network entity, in accordance with the present disclosure. Example process 700 is an example where the network entity (e.g., base station 110) performs operations associated with resetting a beam based at least in part on an SCS.

As shown in FIG. 7, in some aspects, process 700 may include receiving, from a UE, a TRP-specific BFR MAC-CE indicating a new beam for the UE based at least in part on a TRP with beam failure (block 710). For example, the network entity (e.g., using communication manager 150 and/or reception component 902, depicted in FIG. 9) may receive, from a UE, a TRP-specific BFR MAC-CE indicating a new beam for the UE based at least in part on a TRP with beam failure, as described above.

As further shown in FIG. 7, in some aspects, process 700 may include transmitting, to the UE, a TRP-specific BFR response based at least in part on the TRP-specific BFR MAC-CE (block 720). For example, the network entity (e.g., using communication manager 150 and/or transmission component 904, depicted in FIG. 9) may transmit, to the UE, a TRP-specific BFR response based at least in part on the TRP-specific BFR MAC-CE, as described above.

As further shown in FIG. 7, in some aspects, process 700 may include receiving, from the UE, a transmission based at least in part on the new beam that is based at least in part on an SCS for a TRP-specific BFR beam resetting timing when an SCS associated with the TRP-specific BFR response is different than an SCS associated with the TRP with beam failure (block 730). For example, the network entity (e.g., using communication manager 150 and/or reception component 902, depicted in FIG. 9) may receive, from the UE, a transmission based at least in part on the new beam that is based at least in part on an SCS for a TRP-specific BFR beam resetting timing when an SCS associated with the TRP-specific BFR response is different than an SCS associated with the TRP with beam failure, as described above.

Process 700 may include additional aspects, such as any single aspect or any combination of aspects described below and/or in connection with one or more other processes described elsewhere herein.

In a first aspect, transmitting the TRP-specific BFR response comprises transmitting the TRP-specific BFR response in DCI.

In a second aspect, alone or in combination with the first aspect, the TRP-specific BFR beam resetting timing is associated with a quantity of symbols.

In a third aspect, alone or in combination with one or more of the first and second aspects, the TRP-specific BFR beam resetting timing spans a first time at which the UE receives the TRP-specific BFR response and a second time at which the UE resets to the new beam.

In a fourth aspect, alone or in combination with one or more of the first through third aspects, the SCS for the TRP-specific BFR beam resetting timing is a largest SCS or a smallest SCS between the SCS associated with the TRP-specific BFR response and the SCS associated with the TRP with beam failure.

In a fifth aspect, alone or in combination with one or more of the first through fourth aspects, the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and wherein the TRP-specific BFR MAC-CE indicates each of the multiple component carriers associated with the plurality of TRPs with beam failures.

In a sixth aspect, alone or in combination with one or more of the first through fifth aspects, the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the TRP-specific BFR MAC-CE indicates each of the multiple component carriers associated with the plurality of TRPs with beam failures or indicates failed component carriers.

In a seventh aspect, alone or in combination with one or more of the first through sixth aspects, the multiple component carriers are associated with one or more of an SCell, a PCell, or a PSCell.

In an eighth aspect, alone or in combination with one or more of the first through seventh aspects, the joint cell-level and the TRP-specific BFR MAC-CE indicate whether a certain component carrier is associated with one or more of a cell-level beam failure or a TRP-level beam failure, and wherein the joint cell-level and the TRP-specific BFR MAC-CE indicate one or more of a corresponding component carrier index or a TRP index.

In a ninth aspect, alone or in combination with one or more of the first through eighth aspects, the SCS for the TRP-specific BFR beam resetting timing is a largest SCS or a smallest SCS between the SCS associated with the TRP-specific BFR response and a plurality of SCSs associated with a plurality of component carriers with beam failures.

In a tenth aspect, alone or in combination with one or more of the first through ninth aspects, an SCS associated with a component carrier with a beam failure, from the plurality of SCSs associated with the plurality of component carriers with beam failures, corresponds to an SCS of an active bandwidth part of the component carrier associated with the beam failure.

In an eleventh aspect, alone or in combination with one or more of the first through tenth aspects, the SCS associated with the TRP-specific BFR response corresponds to an SCS of an active bandwidth part of a component carrier on which DCI indicating the TRP-specific BFR response is received.

In a twelfth aspect, alone or in combination with one or more of the first through eleventh aspects, the SCS associated with the TRP with beam failure corresponds to an SCS of an active bandwidth part of a component carrier associated with the TRP with beam failure.

In a thirteenth aspect, alone or in combination with one or more of the first through twelfth aspects, the TRP-specific BFR beam resetting timing may be for one or more of CORESETs, PDSCHs, CSI-RSs, PUCCHs, PUSCHs, or SRSs associated with the TRP with beam failure or a component carrier associated with the beam failure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
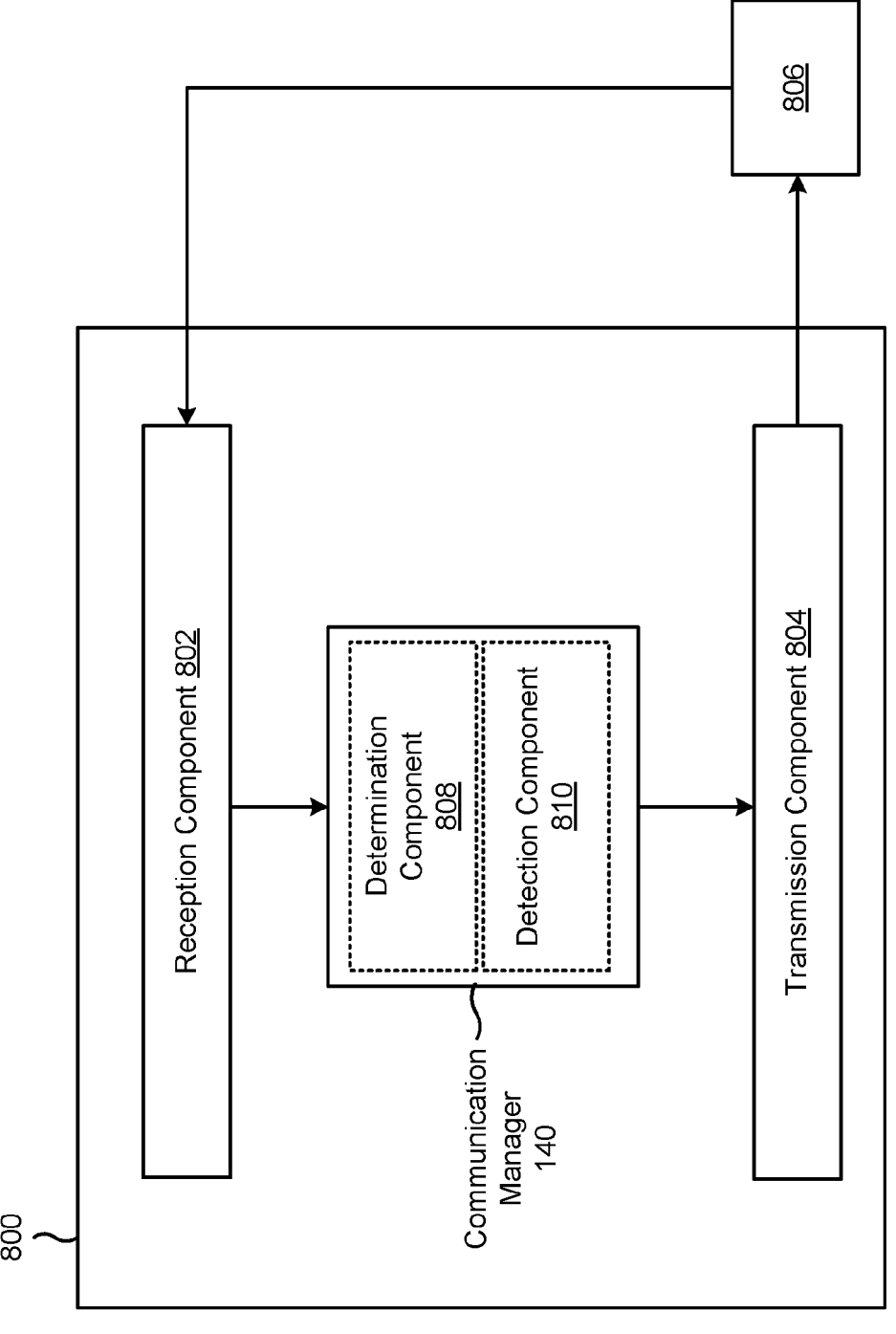
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808, or a detection component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit, to a network entity, a TRP-specific BFR MAC-CE indicating a new beam for the UE based at least in part on a TRP with beam failure. The reception component 802 may receive, from the network entity, a TRP-specific BFR response based at least in part on the TRP-specific BFR MAC-CE. The determination component 808 may determine an SCS for a TRP-specific BFR beam resetting timing based at least in part on an SCS associated with the TRP-specific BFR response being different than an SCS associated with the TRP with beam failure. The transmission component 804 may use the new beam, after resetting to the new beam based at least in part on the SCS for the TRP-specific BFR beam resetting timing, to perform a transmission to the network entity. The detection component 810 may detect the TRP with beam failure based at least in part on a beam measurement of a beam associated with the TRP not satisfying a threshold.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
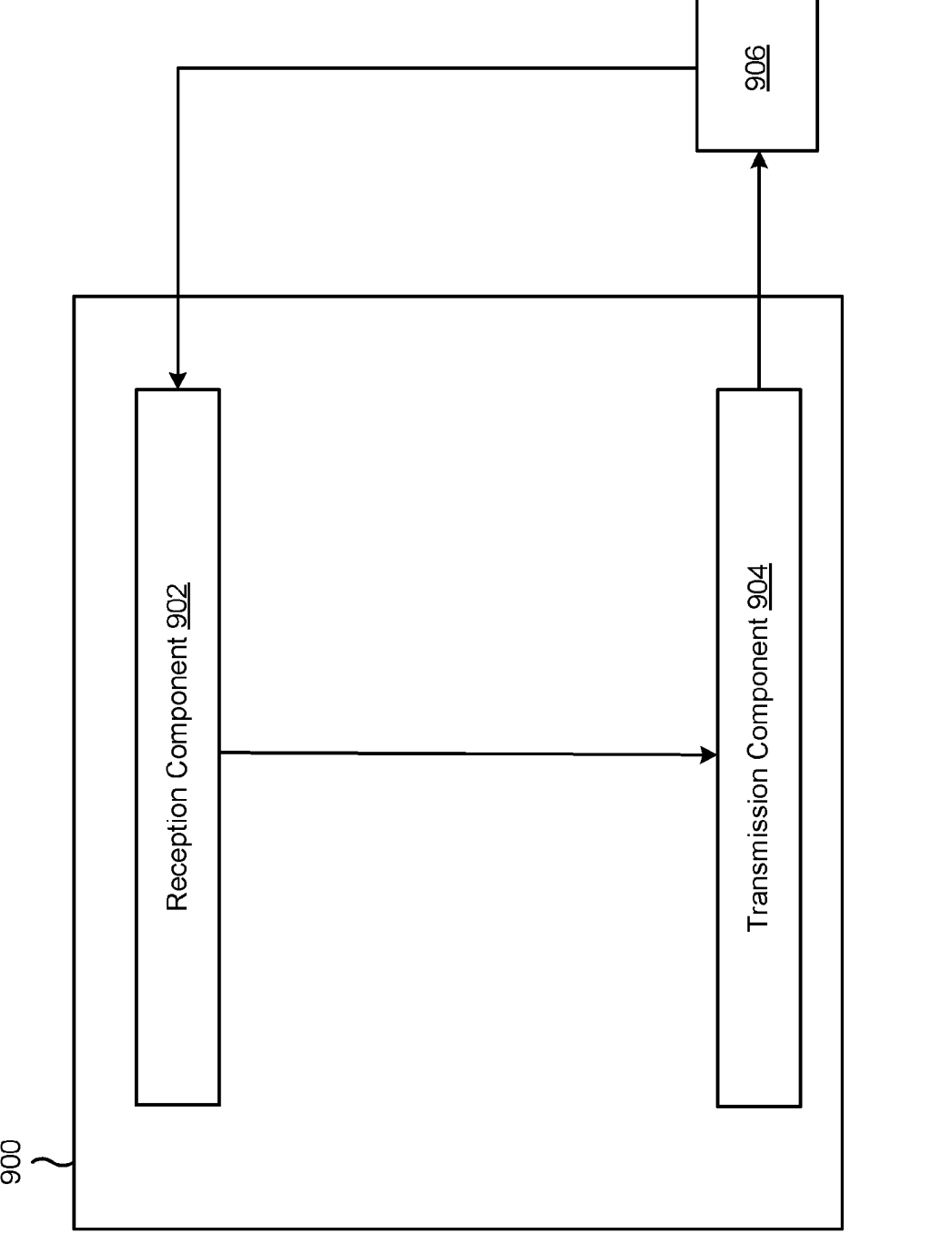

FIG. 9 is a block diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, a TRP-specific BFR MAC-CE indicating a new beam for the UE based at least in part on a TRP with beam failure. The transmission component 904 may transmit, to the UE, a TRP-specific BFR response based at least in part on the TRP-specific BFR MAC-CE. The reception component 902 may receive, from the UE, a transmission based at least in part on the new beam that is based at least in part on an SCS for a TRP-specific BFR beam resetting timing when an SCS associated with the TRP-specific BFR response is different than an SCS associated with the TRP with beam failure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram illustrating an example 1000 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 10 may include one or more CUs 1010 that can communicate directly with a core network 1020 via a backhaul link, or indirectly with the core network 1020 through one or more disaggregated base station units (such as a Near-RT RIC 1025 via an E2 link, or a Non-RT RIC 1015 associated with a Service Management and Orchestration (SMO) Framework 1005, or both). A CU 1010 may communicate with one or more DUs 1030 via respective midhaul links, such as an F1 interface. The DUs 1030 may communicate with one or more RUs 1040 via respective fronthaul links. The RUs 1040 may communicate with respective UEs 120 via one or more radio frequency (RF) access links. In some implementations, the UE 120 may be simultaneously served by multiple RUs 1040.

Each of the units (e.g., the CUs 1010, the DUs 1030, the RUs 1040), as well as the Near-RT RICs 1025, the Non-RT RICs 1015, and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (e.g., Central Unit-User Plane (CU-UP)), control plane functionality (e.g., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1030 may further host one or more low-PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via 01) or via creation of RAN management policies (such as A1 policies).

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: transmitting, to a network entity, a transmit receive point (TRP)-specific beam failure recovery (BFR) medium access control control element (MAC-CE) indicating a new beam for the UE based at least in part on a TRP with beam failure; receiving, from the network entity, a TRP-specific BFR response based at least in part on the TRP-specific BFR MAC-CE; determining a subcarrier spacing (SCS) for a TRP-specific BFR beam resetting timing based at least in part on an SCS associated with the TRP-specific BFR response being different than an SCS associated with the TRP with beam failure; and using the new beam, after resetting to the new beam based at least in part on the SCS for the TRP-specific BFR beam resetting timing, to perform a transmission to the network entity.

Aspect 2: The method of Aspect 1, further comprising: detecting the TRP with beam failure based at least in part on a beam measurement of a beam associated with the TRP not satisfying a threshold.

Aspect 3: The method of any one of Aspects 1 through 2, wherein receiving the TRP-specific BFR response comprises receiving the TRP-specific BFR response in downlink control information.

Aspect 4: The method of any one of Aspects 1 through 3, wherein the TRP-specific BFR beam resetting timing is associated with a quantity of symbols.

Aspect 5: The method of any one of Aspects 1 through 4, wherein the TRP-specific BFR beam resetting timing spans a first time at which the UE receives the TRP-specific BFR response and a second time at which the UE resets to the new beam.

Aspect 6: The method of any one of Aspects 1 through 5, wherein the SCS for the TRP-specific BFR beam resetting timing is a largest SCS or a smallest SCS between the SCS associated with the TRP-specific BFR response and the SCS associated with the TRP with beam failure.

Aspect 7: The method of any one of Aspects 1 through 6, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and wherein the TRP-specific BFR MAC-CE indicates each of the multiple component carriers associated with the plurality of TRPs with beam failures.

Aspect 8: The method of any one of Aspects 1 through 7, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the TRP-specific BFR MAC-CE indicates each of the multiple component carriers associated with the plurality of TRPs with beam failures or indicates failed component carriers.

Aspect 9: The method of Aspect 8, wherein the multiple component carriers are associated with one or more of a secondary cell, a primary cell, or a primary secondary cell.

Aspect 10: The method of Aspect 8, wherein the joint cell-level and the TRP-specific BFR MAC-CE indicate whether a certain component carrier is associated with one or more of a cell-level beam failure or a TRP-level beam failure, and wherein the joint cell-level and the TRP-specific BFR MAC-CE indicate one or more of a corresponding component carrier index or a TRP index.

Aspect 11: The method of any one of Aspects 1 through 10, wherein the SCS for the TRP-specific BFR beam resetting timing is a largest SCS or a smallest SCS between the SCS associated with the TRP-specific BFR response and a plurality of SCSs associated with a plurality of component carriers with beam failures.

Aspect 12: The method of Aspect 11, wherein an SCS associated with a component carrier with a beam failure, from the plurality of SCSs associated with the plurality of component carriers with beam failures, corresponds to an SCS of an active bandwidth part of the component carrier associated with the beam failure.

Aspect 13: The method of any one of Aspects 1 through 12, wherein the SCS associated with the TRP-specific BFR response corresponds to an SCS of an active bandwidth part of a component carrier on which downlink control information indicating the TRP-specific BFR response is received.

Aspect 14: The method of any one of Aspects 1 through 13, wherein the SCS associated with the TRP with beam failure corresponds to an SCS of an active bandwidth part of a component carrier associated with the TRP with beam failure.

Aspect 15: The method of any one of Aspects 1 through 14, wherein the TRP-specific BFR beam resetting timing may be for one or more of: control resource sets, physical downlink shared channels, channel state information reference signals, physical uplink control channels, physical uplink shared channels, or sounding reference signals associated with the TRP with beam failure or a component carrier associated with the beam failure.

Aspect 16: A method of wireless communication performed by a network entity, comprising: receiving, from a user equipment (UE), a transmit receive point (TRP)-specific beam failure recovery (BFR) medium access control control element (MAC-CE) indicating a new beam for the UE based at least in part on a TRP with beam failure; transmitting, to the UE, a TRP-specific BFR response based at least in part on the TRP-specific BFR MAC-CE; and receiving, from the UE, a transmission based at least in part on the new beam that is based at least in part on a subcarrier spacing (SCS) for a TRP-specific BFR beam resetting timing when an SCS associated with the TRP-specific BFR response is different than an SCS associated with the TRP with beam failure.

Aspect 17: The method of Aspect 16, wherein transmitting the TRP-specific BFR response comprises transmitting the TRP-specific BFR response in downlink control information.

Aspect 18: The method of any one of Aspects 16 through 17, wherein the TRP-specific BFR beam resetting timing is associated with a quantity of symbols.

Aspect 19: The method of any one of Aspects 16 through 18, wherein the TRP-specific BFR beam resetting timing spans a first time at which the UE receives the TRP-specific BFR response and a second time at which the UE resets to the new beam.

Aspect 20: The method of any one of Aspects 16 through 19, wherein the SCS for the TRP-specific BFR beam resetting timing is a largest SCS or a smallest SCS between the SCS associated with the TRP-specific BFR response and the SCS associated with the TRP with beam failure.

Aspect 21: The method of any one of Aspects 16 through 20, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and wherein the TRP-specific BFR MAC-CE indicates each of the multiple component carriers associated with the plurality of TRPs with beam failures.

Aspect 22: The method of any one of Aspects 16 through 21, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the TRP-specific BFR MAC-CE indicates each of the multiple component carriers associated with the plurality of TRPs with beam failures or indicates failed component carriers.

Aspect 23: The method of Aspect 22, wherein the multiple component carriers are associated with one or more of a secondary cell, a primary cell, or a primary secondary cell.

Aspect 24: The method of Aspect 22, wherein the joint cell-level and the TRP-specific BFR MAC-CE indicate whether a certain component carrier is associated with one or more of a cell-level beam failure or a TRP-level beam failure, and wherein the joint cell-level and the TRP-specific BFR MAC-CE indicate one or more of a corresponding component carrier index or a TRP index.

Aspect 25: The method of any one of Aspects 16 through 24, wherein the SCS for the TRP-specific BFR beam resetting timing is a largest SCS or a smallest SCS between the SCS associated with the TRP-specific BFR response and a plurality of SCSs associated with a plurality of component carriers with beam failures.

Aspect 26: The method of Aspect 25, wherein an SCS associated with a component carrier with a beam failure, from the plurality of SCSs associated with the plurality of component carriers with beam failures, corresponds to an SCS of an active bandwidth part of the component carrier associated with the beam failure.

Aspect 27: The method of any one of Aspects 16 through 26, wherein the SCS associated with the TRP-specific BFR response corresponds to an SCS of an active bandwidth part of a component carrier on which downlink control information indicating the TRP-specific BFR response is received.

Aspect 28: The method of any one of Aspects 16 through 27, wherein the SCS associated with the TRP with beam failure corresponds to an SCS of an active bandwidth part of a component carrier associated with the TRP with beam failure.

Aspect 29: The method of any one of Aspects 16 through 28, wherein the TRP-specific BFR beam resetting timing may be for one or more of: control resource sets, physical downlink shared channels, channel state information reference signals, physical uplink control channels, physical uplink shared channels, or sounding reference signals associated with the TRP with beam failure or a component carrier associated with the beam failure.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: A device for wireless communication, comprising a memory and one or more processors coupled to the memory, the one or more processors configured to perform the method of one or more of Aspects 1-15.

Aspect 32: An apparatus for wireless communication, comprising at least one means for performing the method of one or more of Aspects 1-15.

Aspect 33: A non-transitory computer-readable medium storing code for wireless communication, the code comprising instructions executable by a processor to perform the method of one or more of Aspects 1-15.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: An apparatus for wireless communication at a device, comprising a processor; memory coupled with the processor; and instructions stored in the memory and executable by the processor to cause the apparatus to perform the method of one or more of Aspects 16-29.

Aspect 36: A device for wireless communication, comprising a memory and one or more processors coupled to the memory, the one or more processors configured to perform the method of one or more of Aspects 16-29.

Aspect 37: An apparatus for wireless communication, comprising at least one means for performing the method of one or more of Aspects 16-29.

Aspect 38: A non-transitory computer-readable medium storing code for wireless communication, the code comprising instructions executable by a processor to perform the method of one or more of Aspects 16-29.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:

a memory; and one or more processors, coupled to the memory, configured to:

transmit, to a network entity, a beam failure recovery (BFR) medium access control control element (MAC-CE); and receive, from the network entity, a transmit receive point (TRP)-specific BFR response based at least in part on the BFR MAC-CE, wherein a subcarrier spacing (SCS) for a TRP-specific BFR beam resetting timing is based at least in part on an SCS associated with the TRP-specific BFR response being different than an SCS associated with a TRP with beam failure.

2. The apparatus of claim 1, wherein the BFR MAC-CE is a TRP-specific BFR MAC-CE that indicates a new beam for the UE based at least in part on the TRP with beam failure, and wherein the one or more processors are further configured to:

detect the TRP with beam failure based at least in part on a beam measurement of a beam associated with the TRP not satisfying a threshold; and use the new beam, after resetting to the new beam based at least in part on the SCS for the TRP-specific BFR beam resetting timing, to perform a transmission to the network entity.

3. The apparatus of claim 1, wherein the one or more processors, to receive the TRP-specific BFR response, are configured to receive the TRP-specific BFR response in downlink control information.

4. The apparatus of claim 1, wherein the TRP-specific BFR beam resetting timing is associated with a quantity of symbols.

5. The apparatus of claim 1, wherein the TRP-specific BFR beam resetting timing spans a first time at which the UE receives the TRP-specific BFR response and a second time at which the UE resets to a new beam.

6. The apparatus of claim 1, wherein the SCS for the TRP-specific BFR beam resetting timing is a largest SCS or a smallest SCS between the SCS associated with the TRP-specific BFR response and the SCS associated with the TRP with beam failure.

7. The apparatus of claim 1, wherein the SCS for the TRP-specific BFR beam resetting timing is a smallest SCS between the SCS associated with the TRP-specific BFR response and a plurality of SCSs associated with a plurality of TRPs with beam failures.

8. The apparatus of claim 1, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the BFR MAC-CE indicates each of the multiple component carriers associated with the plurality of TRPs with beam failures or indicates failed component carriers.

9. The apparatus of claim 8, wherein the multiple component carriers are associated with one or more of a secondary cell, a primary cell, or a primary secondary cell.

10. The apparatus of claim 8, wherein the joint cell-level and the BFR MAC-CE indicate whether a certain component carrier is associated with one or more of a cell-level beam failure or a TRP-level beam failure, and wherein the joint cell-level and the BFR MAC-CE indicate one or more of a corresponding component carrier index or a TRP index.

11. The apparatus of claim 1, wherein the SCS for the TRP-specific BFR beam resetting timing is a largest SCS or a smallest SCS between the SCS associated with the TRP-specific BFR response and a plurality of SCSs associated with a plurality of component carriers with beam failures, and wherein an SCS associated with a component carrier with a beam failure, from the plurality of SCSs associated with the plurality of component carriers with beam failures, corresponds to an SCS of an active bandwidth part of the component carrier associated with the beam failure.

12. The apparatus of claim 1, wherein the SCS associated with the TRP-specific BFR response corresponds to an SCS of an active bandwidth part of a component carrier on which downlink control information indicating the TRP-specific BFR response is received.

13. The apparatus of claim 1, wherein the SCS associated with the TRP with beam failure corresponds to an SCS of an active bandwidth part of a component carrier associated with the TRP with beam failure.

14. The apparatus of claim 1, wherein the TRP-specific BFR beam resetting timing may be for one or more of: control resource sets, physical downlink shared channels, channel state information reference signals, physical uplink control channels, physical uplink shared channels, or sounding reference signals associated with the TRP with beam failure or a component carrier associated with the beam failure.

15. An apparatus of a network entity for wireless communication, comprising:
 a memory; and
 one or more processors, coupled to the memory, configured to:
  receive, from a user equipment (UE), a transmit receive point (TRP)-specific beam failure recovery (BFR) medium access control control element (MAC-CE) indicating a new beam for the UE based at least in part on a TRP with beam failure;
  transmit, to the UE, a TRP-specific BFR response based at least in part on the TRP-specific BFR MAC-CE; and
  receive, from the UE, a transmission based at least in part on the new beam that is based at least in part on a subcarrier spacing (SCS) for a TRP-specific BFR beam resetting timing when an SCS associated with the TRP-specific BFR response is different than an SCS associated with the TRP with beam failure.

16. A method of wireless communication performed by a user equipment (UE), comprising:
 transmitting, to a network entity, a transmit receive point (TRP)-specific beam failure recovery (BFR) medium access control control element (MAC-CE) indicating a new beam for the UE based at least in part on a TRP with beam failure;
 receiving, from the network entity, a TRP-specific BFR response based at least in part on the TRP-specific BFR MAC-CE;
 determining a subcarrier spacing (SCS) for a TRP-specific BFR beam resetting timing based at least in part on an SCS associated with the TRP-specific BFR response being different than an SCS associated with the TRP with beam failure; and
 using the new beam, after resetting to the new beam based at least in part on the SCS for the TRP-specific BFR beam resetting timing, to perform a transmission to the network entity.

17. The method of claim 16, further comprising:
 detecting the TRP with beam failure based at least in part on a beam measurement of a beam associated with the TRP not satisfying a threshold.

18. The method of claim 16, wherein receiving the TRP-specific BFR response comprises receiving the TRP-specific BFR response in downlink control information.

19. The method of claim 16, wherein the TRP-specific BFR beam resetting timing is associated with a quantity of symbols.

20. The method of claim 16, wherein the TRP-specific BFR beam resetting timing spans a first time at which the UE receives the TRP-specific BFR response and a second time at which the UE resets to the new beam.

21. The method of claim 16, wherein the SCS for the TRP-specific BFR beam resetting timing is a largest SCS or a smallest SCS between the SCS associated with the TRP-specific BFR response and the SCS associated with the TRP with beam failure.

22. The method of claim 16, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and wherein the TRP-specific BFR MAC-CE indicates each of the multiple component carriers associated with the plurality of TRPs with beam failures.

23. The method of claim 16, wherein the SCS for the TRP-specific BFR beam resetting timing is a largest SCS or a smallest SCS between the SCS associated with the TRP-specific BFR response and a plurality of SCSs associated with a plurality of TRPs with beam failures, wherein the plurality of TRPs are associated with multiple component carriers, and a joint cell-level and the TRP-specific BFR MAC-CE indicates each of the multiple component carriers associated with the plurality of TRPs with beam failures or indicates failed component carriers.

24. The method of claim 23, wherein the multiple component carriers are associated with one or more of a secondary cell, a primary cell, or a primary secondary cell.

25. The method of claim 23, wherein the joint cell-level and the TRP-specific BFR MAC-CE indicate whether a certain component carrier is associated with one or more of a cell-level beam failure or a TRP-level beam failure, and wherein the joint cell-level and the TRP-specific BFR MAC-CE indicate one or more of a corresponding component carrier index or a TRP index.

26. The method of claim 16, wherein the SCS for the TRP-specific BFR beam resetting timing is a largest SCS or a smallest SCS between the SCS associated with the TRP-specific BFR response and a plurality of SCSs associated with a plurality of component carriers with beam failures, and wherein an SCS associated with a component carrier with a beam failure, from the plurality of SCSs associated with the plurality of component carriers with beam failures, corresponds to an SCS of an active bandwidth part of the component carrier associated with the beam failure.

27. The method of claim 16, wherein the SCS associated with the TRP-specific BFR response corresponds to an SCS of an active bandwidth part of a component carrier on which downlink control information indicating the TRP-specific BFR response is received.

28. The method of claim 16, wherein the SCS associated with the TRP with beam failure corresponds to an SCS of an active bandwidth part of a component carrier associated with the TRP with beam failure.

29. The method of claim 16, wherein the TRP-specific BFR beam resetting timing may be for one or more of: control resource sets, physical downlink shared channels, channel state information reference signals, physical uplink control channels, physical uplink shared channels, or sounding reference signals associated with the TRP with beam failure or a component carrier associated with the beam failure.

30. A method of wireless communication performed by a network entity, comprising:

receiving, from a user equipment (UE), a transmit receive point (TRP)-specific beam failure recovery (BFR) medium access control control element (MAC-CE) indicating a new beam for the UE based at least in part on a TRP with beam failure;

transmitting, to the UE, a TRP-specific BFR response based at least in part on the TRP-specific BFR MAC-CE; and receiving, from the UE, a transmission based at least in part on the new beam that is based at least in part on a subcarrier spacing (SCS) for a TRP-specific BFR beam resetting timing when an SCS associated with the TRP-specific BFR response is different than an SCS associated with the TRP with beam failure.

* * * * *